United States Patent [19]

Collins

[11] 4,342,953

[45] Aug. 3, 1982

[54] BATTERY PROTECTION CIRCUIT

[75] Inventor: John J. Collins, Kansas City, Mo.

[73] Assignee: Nicholl Brothers, Inc., Kansas City, Mo.

[21] Appl. No.: 145,900

[22] Filed: May 2, 1980

[51] Int. Cl.$^3$ .............................................. H02J 7/10
[52] U.S. Cl. .................................. 320/13; 307/10 BP; 320/48; 340/636
[58] Field of Search ............... 320/13, 48; 307/10 BP; 340/636

[56] References Cited

U.S. PATENT DOCUMENTS

| | | | |
|---|---|---|---|
| 3,321,754 | 5/1967 | Grimm et al. | 340/636 |
| 3,349,386 | 10/1967 | Zug | 340/636 |
| 3,447,060 | 5/1969 | Tedd et al. | 320/48 |
| 3,474,296 | 10/1969 | Rickey | 320/40 X |
| 3,522,481 | 8/1970 | Terzic | 320/40 X |
| 3,529,230 | 9/1970 | Tedd | 320/48 |
| 3,576,488 | 4/1971 | Zug et al. | 320/48 |
| 3,678,499 | 7/1972 | McCarty | 340/336 |
| 3,750,023 | 7/1973 | Weissenborn et al. | 325/105 |
| 3,979,657 | 9/1976 | Yorksie | 320/13 |
| 4,004,288 | 1/1977 | Webb, Jr. | 340/248 B |
| 4,019,112 | 4/1977 | Satoh | 320/48 |
| 4,030,086 | 6/1977 | Salem | 340/237.5 |
| 4,086,525 | 4/1978 | Ibsen et al. | 320/33 |
| 4,139,846 | 2/1979 | Conforti | 340/636 |

*Primary Examiner*—Robert J. Hickey

*Attorney, Agent, or Firm*—Fishburn, Gold and Litman

[57] ABSTRACT

A battery protection circuit particularly for portable lamps employing rechargeable batteries is provided to prevent overdischarge of the batteries and includes a bulb drive transistor connecting a bulb across the battery with a switch interposed between one side of the battery and the bulb, a voltage sensing resistor connected to one side of the switch, a regenerative switch connected between the sensing resistor and the other side of the battery, and the regenerative switch including an output terminal connected by a base resistor to the base of the drive transistor. The regenerative switch includes a pair of transistors connected and cooperating such that when one of the transistors is turned on, the other is caused to be turned on, the transistors, further, maintaining each other on. As the dropout voltage of the battery is approached, the base drive of the drive transistor decreases which causes the bulb to become dim to thereby warn of the discharged state of the battery. At the dropout voltage, the voltage across the sensing resistor, which is substantially in parallel with the base-emitter junction of one of the switch transistors, is reduced to a level which is not sufficient to maintain the sensing transistor on whereby the switch transistors are turned off, resulting in the turn-off of the drive transistor so that the battery is protected from overdischarge.

11 Claims, 2 Drawing Figures

4,342,953

BATTERY PROTECTION CIRCUIT

FIELD OF THE INVENTION

The present invention relates to protection devices to prevent overdischarge of rechargeable batteries and, more particularly, to such a device which causes the dimming of a lantern bulb prior to extinguishing thereof.

BACKGROUND OF THE INVENTION

In the use of rechargeable batteries, it is well known that discharge of certain types thereof past a certain point results in essentially irreversible chemical changes within the batteries which often result in the inability to fully charge the batteries thereafter and which shorten the useful lives of the batteries. Since rechargeable or secondary batteries are more expensive to purchase than primary or non-rechargeable batteries, schemes have been devised to warn the rechargeable battery user of the state of discharge of the batteries. All known schemes make use of the fact that as the battery is exhausted, the terminal voltage thereof, particularly under load, decreases. Some warning schemes include the use of warning lights which are lit or extinguished when the battery voltage drops below a certain level; others cause the shut-off of the device or portions thereof when the battery voltage drops.

In the use of batteries to power portable lamps or lanterns, the long and almost universal use of non-rechargeable batteries, principally the carbon-zinc or Leclanche cells, has developed habits of use which, when applied to lamps employing rechargeable batteries, are detrimental to the batteries. Specifically, it is customary to attempt to drain every last bit of useable energy out of carbon-zinc batteries, since they will be disposed of after discharge thereof. Manufacturers of portable lamps employing rechargeable batteries normally provide instructions regarding the charging, use, and limitations of discharge of the batteries. However, such instructions are often ignored; and when misuse of the batteries results in failure thereof, the manufacturer is blamed. For this reason, warning devices were devised to notify the user of a low voltage state of the battery before permanent damage could occur. However, the warning devices are often ignored. In order to more positively prevent the misuse of the batteries, shut-off devices were employed. Such shut-off devices are effective in protecting the batteries, but it has been found that battery users are often confused by the automatic shut-off of the device employing the batteries, suspecting that a defect in the device is the cause. In general consumers do not understand or expect an instantaneous cutoff of voltage to the device they are using and have in effect been "trained" through use of non rechargeable batteries that such a cutoff without normal dimming of a bulb (or other sign that the batteries are going "dead") means something defective other than the batteries.

SUMMARY OF THE INVENTION

In order to overcome the difficulties of prior battery warning systems, the present invention provides a battery discharge protection system which protects the battery from overdischarge and which warns the user in a non-confusing manner of the need to recharge the battery. More particularly, the battery protection device of the present invention causes a lantern bulb to become dim in a manner such that the user believes the batteries to be nearly or completely discharged prior to the shut-off thereof by a deep discharge protection circuit or device. Such a warning should clearly convey to the user the need for recharging the batteries without confusion as to a defect in the lantern.

OBJECTS OF THE INVENTION

Therefore the principal objects of the present invention are: to provide an improved battery protection circuit particularly for a lantern powered by a rechargeable battery which warns the lantern user of the need to recharge the battery; to provide such a circuit which positively informs the lantern user of the need for a battery recharge in such a manner that the lantern user is not led to believe that the lantern is defective; to provide such a circuit which produces such a warning by dimming of the lantern bulb and subsequent extinguishing thereof during use of the lantern prior to total discharge of the batteries or prior to battery discharge to such a level as to cause permanent damage to the batteries; to provide such a circuit including a transistor to drive the bulb and a voltage sensitive switch to drive the transistor, the voltage sensitive switch functioning to operate the bulb brightly at a high state of battery charge, to operate the bulb dimly as a dropout battery voltage is approached, and to extinguish the bulb as the dropout battery voltage is reached; to provide such a circuit which does not draw an appreciable current load from the battery; to provide such a circuit which is positive and efficient in operation, and which is particularly well adapted for its intended purpose.

Other objects and advantages of the present invention will become apparent from the following description taken in connection with the accompanying drawings wherein are set forth, by way of illustration and example, certain embodiments of the BATTERY PROTECTION CIRCUIT, according to the present invention.

The drawings constitute a part of the specification, include an exemplary embodiment of the present invention, and illustrate various objects and features thereof.

DETAILED DESCRIPTION OF THE PREFERRED EMBODIMENTS

Figure 1:
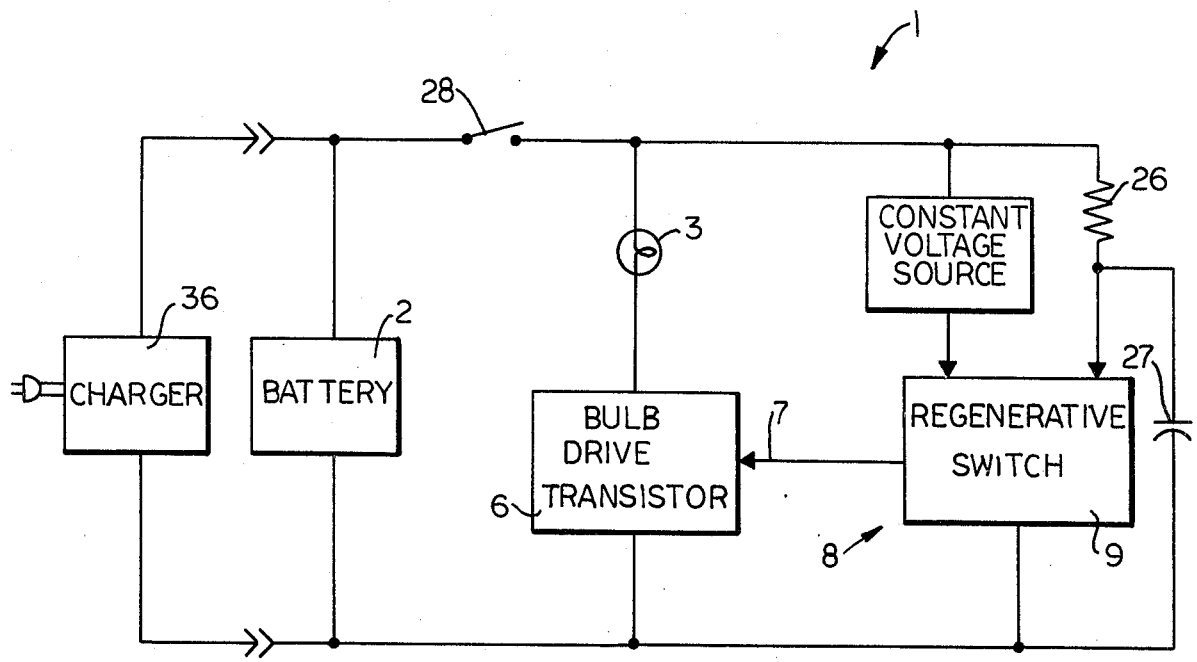
FIG. 1 is a block diagram of the battery protection circuit.

Referring to the drawings in more detail:

The reference numeral 1 generally designates a battery protection circuit adapted to warn an operator of the need to recharge a battery 2, particularly in a portable lantern (not shown) by dimming of a bulb 3 or diminishing power to another similiar load means when the battery voltage approaches a dropout voltage level below which no further discharge of the battery 2 is desired in order to protect such a battery and further adapted to extinguish the bulb 3 when the dropout voltage level is actually reached, such that the battery 2 will not over or deep discharge and thereby become permanently damaged.

The circuit 1 generally comprises a load drive transistor 6 connecting the bulb 3 across the battery and allowing current flow through the bulb 3 when sufficient drive current is applied to the base 7 of the transistor 6.

The circuit 1 also includes a voltage sensitive switch means 8 connected across the battery 2 and connected to the base 7 of the drive transistor 6. The voltage sensitive switch 8 may be any type of circuit which accomplishes the desired objectives and in a preferred form includes a regenerative switch 9 comprising a pair of transistors 10 and 11 having the bases and collectors thereof interconnected in such a manner that turning on one of the transistors, for example transistor 10, causes the other transistor 11 to be turned on, the transistors 10 and 11 thereafter cooperating to maintain one another in a saturated state.

Figure 2:
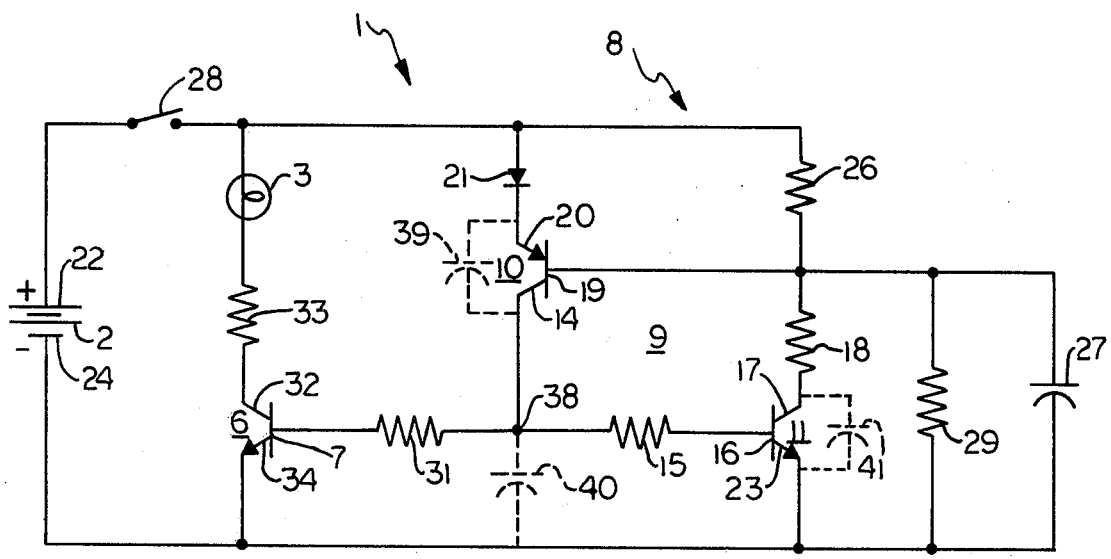
FIG. 2 is a detailed schematic diagram of the battery protection circuit.

With reference to FIG. 2, the transistor 10 has a collector 14 connected through a base resistor 15 to a base 16 of the transistor 11. In turn, the transistor 11 has a collector 17 thereof connected through a collector resistor 18 to the base 19 of the transistor 10. The output of the transistor 10, therefore, is fed to the input of transistor 11; and the output of transistor 11 is fed back to the input of transistor 10. The transistors 10 and 11 are a complementary pair; that is, one of the transistors (here 10) is a PNP type while the other (here 11) is an NPN type. An emitter 20 of the transistor 10 is connected through a constant voltage source, such as a diode 21, to the positive side 22 of the battery 2 while an emitter 23 of the transistor 11 is connected to the negative side 24 of the battery 2.

In order to turn transistor 10 on and maintain same in an on condition, a voltage sensing resistor 26 is connected from the base 19 of transistor 10 to the positive side of the battery to receive current flow therethrough thereby providing a voltage drop across the sensing resistor 26 which is applied to the base-emitter junction of the transistor 10. In order to initiate turn on of transistor 10, a capacitor 27 is connected from the base 19 of transistor 10 to the negative side 24 of the battery 2 and an ON/OFF switch 28 is provided. Upon closure of the switch 28, current flows through the sensing resistor 26 to charge the capacitor 27, such current flow establishing conduction of current through transistor 10. A time constant resistor 29 is provided in parallel with the capacitor 27 to regulate the speed at which the capacitor 27 is charged and further serves to discharge the capacitor 27 when the switch 28 is opened to prepare for the next turn on cycle.

The collector 14 of transistor 10 is connected through a base resistor 31 to the base 7 of the drive transistor 6. A collector 32 of the transistor 6 is connected through a resistor 33 to the bulb 3 and therethrough to one side of one switch 28. An emitter 34 of the transistor 6 is connected to the negative side 24 of the battery 2.

In operation, it is first assumed that the battery 2 has been fully charged by connection to a suitable charger 36, as shown in FIG. 1. When use of the lantern incorporating the circuit 1 is desired, the switch 28 is closed, causing charging current for the capacitor 27 to flow through the voltage sensing resistor 26. The resulting voltage drop across the sensing resistor 26 is sufficient to cause conduction of current through the diode 21 and the base-emitter junction of transistor 10 thereby turning same on and establishing current flow through the emitter 20 to the collector 14 of transistor 10.

The collector current of transistor 10 divides at the junction 38 with a minor portion flowing to the base 16 of transistor 11 and a major portion flowing to the base 7 of the drive transistor 6. The proportions by which the collector current of transistor 10 divides is determined by the relative resistances of the base resistors 31 and 15.

The base current flowing into transistor 11 turns same on thereby establishing current flow from the collector 17 thereof which collector current is fed back to the base 19 of transistor 10. The currents through transistors 10 and 11 increase because of the positive feedback or regenerative manner in which the transistors 10 and 11 are connected until the transistors are driven into a stable saturated state.

In the meantime, the portion of the collector current from transistor 10 which is fed to the base 7 of transistor 6 increases until it too is driven into saturation whereby a maximum level of current is conducted through the bulb 3, thereby illuminating same brightly.

The voltage drop across the voltage sensing resistor 26 is determined by the current flow through the voltage divider formed by resistors 26 and 18. As long as the voltage across resistor 26 is greater than that needed to maintain the diode 21 and the transistor 10 in an ON condition, the regenerative switch 9 is maintained in an ON condition such that base drive is supplied to transistor 6.

The amount of base drive current supplied to transistor 6 for a given voltage of the battery 2 is determined by the resistance of base resistor 31. The base current through resistor 31 may be thought of as the quantity of the voltage at the junction 38 with respect to the negative side 24 of the battery minus the base-emitter voltage of transistor 6, divided by the resistance of resistor 31. The voltage at junction 38 is equal to the battery voltage minus the voltage drops of the diode 21 and the emitter-collector circuit of transistor 10. The voltage drops across the diode 21 and emitter-collector of transistor 10 are substantially constant when such elements are in saturation.

It can be demonstrated that if the constant voltage drop across the diode 21 is made an appreciable fraction of the battery voltage, then a relatively small change in the battery voltage results in a relatively large change in the base current of transistor 6. This may be accomplished by providing several conventional diodes, a light emitting diode (LED), or a suitably rated Zener diode (in reverse biased mode). In one embodiment, the diode 21 is an LED. By using an LED, if the LED is lit but not the bulb 3, the indication is that the bulb is burned out.

As the battery 2 is discharged and the terminal voltage is decreased, the base current of transistor 6 also decreases. As the base current decreases, the saturation voltage or collector-emitter voltage drop of transistor 6 increases thereby decreasing the current flow through the bulb 3. The resistance of resistor 31 is selected such that as the battery voltage decreases toward the dropout voltage, below which no further battery discharge is desirable, the transistor 6 is brought into the active region and the collector current thereof decreases linearly with decreases in the base current.

The resistance of the voltage sensing resistor 26 is selected such that when the battery 2 voltage reaches the selected dropout voltage, the voltage drop across the resistor 26 is just below that which is required to keep the LED 21 and the transistor 10 turned on. Therefore, at the dropout voltage the various regenerative switch elements and especially the transistor 10 are turned off; the transistor 6, deprived of base current, is also turned off which results in the bulb 3 being completely extinguished.

The designed dropout voltage of the battery 2 is higher than the fully discharged voltage or such a discharge voltage which would damage the battery 2 so as to provide a suitable margin of safety for the battery 2. The resistance of the base resistor 31 is selected such that the bulb 3 begins to dim at a battery voltage slightly higher than the drop out voltage.

The dimming of the bulb 3 provides a non-confusing warning to a user that the batteries need to be recharged. The shut-off of the circuit 1 at the dropout voltage prevents further discharge of the battery unless the switch 28 is opened and reclosed. After dropout, the battery voltage normally begins to rise due to the lack of a load thereon. If the switch 28 is subsequently closed, the regenerative switch 9 will be triggered, such that the bulb 3 will again be lit until the battery voltage again decreases to the dropout voltage. For some applications, such as emergency situations in which destruction of the battery by over discharging is not the overriding concern, it may be desirable to provide a bypass of the protection circuit 1 by means such as a switch to short circuit the collector-emitter circuit of transistor 6.

The battery protection circuit 1 has been described in terms of a portable lantern. However, the circuit 1 is not limited to use with lanterns, but would be applicable, with suitable modifications to many other types of systems employing rechargeable batteries. In some instances, parasitic suppressor capicitors 39, 40 and 41 may be required for stable operation of the circuit.

It is to be understood that while certain forms of the present invention have been described and illustrated, it is not to be limited thereto except insofar as such limitations are included in the following claims.

What is claimed and desired to be secured by Letters Patent is:

1. A battery protection circuit for a device employing a rechargeable battery to protect said battery from damage due to deep discharge thereof, said circuit comprising:
   (a) a rechargeable battery having a battery voltage and a dropout voltage at which no further discharge of said battery is desirable;
   (b) load means operable by current from said battery;
   (c) a load drive transistor connecting said load means across said battery and operable to allow current flow through said load means upon the application of suitable drive current to a base of said drive transistor;
   (d) switching means connected across said battery and to the base of said transistor, said switching means providing said suitable base drive current when said battery voltage exceeds said dropout voltage by a selected degree; said switching means reducing said base drive in response to said battery voltage approaching said dropout voltage whereby the current through said drive transistor is reduced resulting in said load means operating at noticeably diminished capacity to warn of the need to recharge said battery; and said switching means ceasing to provide said base drive in response to said battery voltage decreasing to said dropout voltage to prevent deep discharge of said battery:
   (e) a voltage sensing resistor connected to one terminal of said battery;
   (f) regenerative switch means connected between said sensing resistor and the other terminal of said battery; said regenerative switch means being turned on by a voltage across said sensing resistor above a selector level and being turned off upon said voltage across said sensing resistor decreasing below said selected level;
   (g) said regenerative switch means having an output terminal providing a base drive voltage related to the level of said battery voltage;
   (h) a base resistor connecting said output terminal to the base of said drive transistor such that said base drive current flows through said base resistor when said switch is turned on whereby said drive transistor conducts current through said load means;
   (i) said base resistor having a resistance selected such that said load is operated at noticeably diminished capacity as said dropout voltage is approached to warn of the need to recharge said battery; and
   (j) said sensing resistor having a resistance selected such that said regenerative switch means is turned off upon said battery voltage decreasing to said dropout voltage whereby said base drive current ceases and said drive transistor is cut off thereby cutting off the flow of current through said load means to prevent further discharge of said battery.

2. A circuit as set forth in claim 1 wherein said regenerative switch means include a constant voltage source means connected to one of said battery terminals, said constant voltage source means being connected to effect a relatively large change in said base drive current for a given change in said battery voltage.

3. A circuit as set forth in claim 2 wherein said constant voltage source means comprises a diode.

4. A circuit as set forth in claim 3 wherein said diode is a light emitting diode.

5. A battery protector circuit for a device employing a rechargeable battery; said circuit for protecting said battery from damage due to deep discharge thereof; said circuit comprising;
   (a) a rechargeable battery having a battery voltage and a dropout voltage at which no further discharge of said battery is desirable;
   (b) load means operable by current from said battery;
   (c) a load drive transistor connecting said load means across said battery and operable to allow current flow through said load means upon the application of suitable drive current to a base of said drive transistor;
   (d) a voltage sensing resistor connected to one terminal of said battery;
   (e) regenerative switch means connected between said voltage sensing resistor and the other terminal of said battery, said switch means being turned on upon the voltage across said sensing resistor exceeding a selected level and being turned off upon said voltage across said sensing resistor decreasing below said selected level;
   (f) said switch means having an output terminal providing a base drive voltage related to the level of said battery voltage;
   (g) a base resistor connecting said output terminal to the base of said drive transistor such that base drive current flows therethrough when said switch means is turned on whereby said drive transistor conducts current through said load means;
   (h) said base resistor having a resistance selected such that said load is operated at noticeably diminished capacity as said dropout voltage is approached to warn of the need to recharge said battery; and
   (i) said sensing resistor having a resistance selected such that said switch means is turned off upon said battery voltage decreasing to said dropout voltage whereby said base drive current ceases and said drive transistor is cut off thereby cutting off the flow of current through said load means to prevent further discharge of said battery.

6. A circuit as set forth in claim 5 wherein said regenerative switch means includes:
   (a) a first switch transistor having an emitter, a collector connected to said base resistor at the end opposite from said drive transistor base and defining said switch means output terminal, and a base connected to said sensing resistor at the end opposite from said one battery terminal;
   (b) constant voltage source means connecting said first switch transistor to said one battery terminal such that said sensing resistor is in parallel with the series combination of said constant voltage source means and the base emitter junction of said first switch transistor;
   (c) a second switch transistor having a base thereof operatively connected to the collector of said first switch transistor, a collector thereof operatively connected to the base of said first switch transistor, and an emitter thereof connected to said other terminal of said battery;
   (d) said first and second switch transistors cooperating such that said first switch transistor upon being turned on causes said second switch transistor to be turned on, said first and second switch transistors maintaining one another in a turned on condition as long as the voltage across said sensing resistor exceeds said selected level; and
   (e) turn on means operable to cause said first transistor to be turned on when said battery voltage exceeds said dropout voltage.

7. A circuit as set forth in claim 6 wherein said turn on means includes:
   (a) a capacitor connected between the base of said first transistor and said other battery terminal; and
   (b) a switch interposed between said one battery terminal and the connection of said sensing resistor and said constant voltage source means; said switch being selectively closeable such that said capacitor is charged by current flow through said sensing resistor, said current flow causing a voltage drop across said sensing resistor which is sufficient to cause said first transistor to turn on when said battery voltage exceeds said dropout voltage.

8. A circuit as set forth in claim 6 wherein said constant voltage source means comprises a diode.

9. A circuit as set forth in claim 8 wherein said diode is a light emitting diode.

10. A circuit as set forth in claim 5 wherein said load means is a light bulb, said bulb being dimmed during operation thereof upon said said battery voltage approaching said dropout voltage.

11. A circuit as set forth in claim 10 wherein said regenerative switch means includes a constant voltage source means connected to said one battery terminal, said constant voltage source means being connected to effect a relatively large change in current flow through said base resistor for a given change in said battery voltage.

* * * * *